United States Patent [19]

Yamada et al.

[11] Patent Number: 5,033,405
[45] Date of Patent: Jul. 23, 1991

[54] GRANULATING AND COATING APPARATUS

[75] Inventors: Shuri Yamada, Kawagoe; Narimichi Takei, Sugito; Nagahiko Tanaka, Sakado; Kazuomi Unosawa, Tokyo, all of Japan

[73] Assignee: Freund Industrial Col, Ltd., Japan

[21] Appl. No.: 547,770

[22] Filed: Jul. 3, 1990

[30] Foreign Application Priority Data

Jul. 7, 1989 [JP] Japan .................. 1-176922

[51] Int. Cl.⁵ .............................................. B29B 7/50
[52] U.S. Cl. .................................... 118/418; 366/54; 425/222
[58] Field of Search ................ 425/222; 204/213, 214; 366/54, 213, 220, 221; 118/58, 400, 418, 417

[56] References Cited

U.S. PATENT DOCUMENTS

| | | | |
|---|---|---|---|
| 4,469,526 | 9/1984 | Budinsky et al. | 204/213 |
| 4,499,847 | 2/1985 | Dunajtschik | 118/19 |
| 4,571,291 | 2/1986 | Schell et al. | 204/213 |
| 4,586,457 | 5/1986 | Dunajtschik | 118/19 |
| 4,640,218 | 2/1987 | Motoyama et al. | 118/19 |
| 4,766,839 | 8/1988 | Dunajtschik | 118/19 |
| 4,785,759 | 11/1988 | Motoyama et al. | 118/19 |

FOREIGN PATENT DOCUMENTS 0187967  12/1934  Switzerland ................ 366/54

Primary Examiner—Willard E. Hoag
Attorney, Agent, or Firm—Kane, Dalsimer, Sullivan, Kurucz, Levy, Eisele and Richard

[57] ABSTRACT

A granulating and coating apparatus comprising a rotary drum to be charged therein a powdery or granular material, and a baffle plate provided in the rotary drum and not rotatable together with the rotary drum. The rotary drum is formed to be a polygonal shape. This polygonal shape may be, for example, a pentagon, a hexagon, an octagon or a decagon. The baffle plate may be positionally fixedly supported. Or, the baffle plate can be made to change a position in a rocking direction, a position of the rotary drum in the axial direction, a depth of insertion into a layer of a powdery or granular material or an angle of insertion by use of plurality of actuators.

11 Claims, 3 Drawing Sheets

GRANULATING AND COATING APPARATUS

BACKGROUND OF THE INVENTION

1. Field of the Invention

This invention relates to granulating and coating techniques, and more particularly to techniques wherein a powdery or granular material is put in a rotary drum rotatable about substantially horizontal shaft and the rotary drum is rotated so as to perform granulating and/or coating, drying and so on of the powdery or granular material.

2. Related Art Statement

As the granulating and coating techniques of the type described, there has been known techniques wherein a rotary drum, which is also called as a coating pan, is rotated about a horizontal shaft and a gas such for example as a hot air is fed into the rotary drum and discharged therefrom, whereby pharmaceuticals, food products, chemical products and other various powdery or granular materials are subjected to granulating and/or coating.

In that case, such a technical problem is posed that how effectively the powdery or granular material in the rotary drum is agitated and mixed so as to perform a desired granulating and/or coating efficiently and uniformly.

To solve this problem, the provision of a baffle means as an obstacle in the rotary drum is proposed (Examined Patent Publication No. 52-10665).

Now, as shown in FIG. 3, since a rotary drum D in the prior art has a circular construction in cross-section, there is a difficulty that a powdery or granular material M, which should be brought to the advanced position in a rotating direction along with the rotation of the rotary drum D, slips on the inner wall surface of the rotary drum D, so that the powdery or granular material M cannot be tumbled satisfactorily.

Furthermore, when slips are extreme, the baffle means contributes as a resistance to enhance slips and even obstructs agitating of the material.

Particularly, in a large-sized apparatus, due to slips, the powdery or granular material may not be rasied even to a position of a baffle means B located at the advanced position in a rotating direction R of the rotary drum D. Thus, although the baffle means is provided in the rotary drum D, it may not be possible to obtain the desired functional effect.

It goes without saying that, even with a small-sized apparatus, due to slips, a layer of the powdery or granular material M may not be tumbled, staying at a predetermined state so that the agitating and mixing effects through the baffle means B are small.

SUMMARY OF THE INVENTION

It is an object of the present invention to provide a granulating and coating apparatus wherein occurrence of slips of the powdery or granular material due to the rotation of the drum can be suppressed, and a baffle means can satisfactorily function in agitating and mixing of the powdery or granular material.

The above-described and other objects and novel characteristics of the present invention will be made apparent from the description of this specification and the accompanying drawings.

Out of the inventions disclosed herein, outlines of the typical invention will be described as follows.

Namely, the rotary drum provided therein with the baffle means which is not rotatable with the rotary drum has a construction of a polygonal cross-section.

With the above-described granulating and coating apparatus according to the present invention, occurrence of slips of the powdery or granular material in the rotary drum can be suppressed by corner portions of the rotary drum having the polygonal construction, so that a problem of slips of the powdery or granular material as seen in the conventional drum having a circular cross-section can be obviated.

With the above-described arrangement according to the present invention, as the rotary drum rotates, the powdery or granular material is raised to a satisfactorily high position without causing slips, effective agitating and mixing can be performed by the baffle means, and efficient and uniform granulating and/or coating can be achieved.

DETAILED DESCRIPTION OF THE PREFERRED EMBODIMENTS

Firstly, a first embodiment of the granulating and coating apparatus according to the present invention will hereunder be described with reference to FIG. 1.

A powdery or granular material M, such as powder or tablets, to be treated is put in a rotary drum 1. The rotary drum 1 is supported by rotatable rollers, not shown, so as to be rotatable about a horizontal axial line by a driving source such as a motor, not shown, through a belt, not shown, and rotated in a rotating direction R, for example.

The rotary drum 1 of this embodiment is formed of a construction of an octagonal cross-section as an example of a polygonal shape, and thereby, can suppress the occurrence of slips of the powdery or granular material M in the rotary drum 1.

Figure 3:
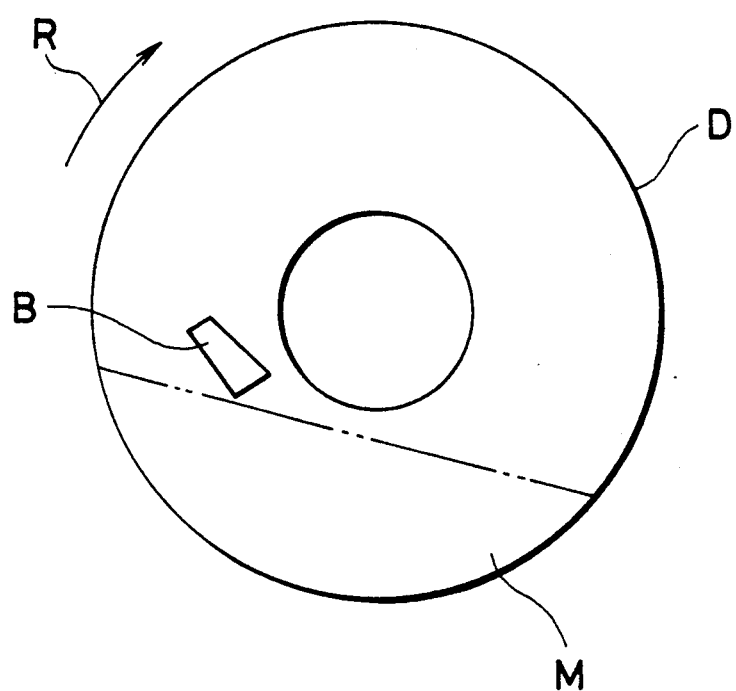
FIG. 3 is a schematic explanatory view of the conventional granulating and coating apparatus.

Namely, in the case of the rotary drum 1 having the octagonal construction, there are totally eight angled portions, i.e. corner portions 1a. Due to the presence of these corner portions 1a and linear portions 1b at every sides, such a disadvantage can be obviated that, due to the rotation of the rotary drum 1, the powdery or granular material M is not brought to the advanced position in the rotating direction, not raised to the position of the baffle means B and make slips as in an example of the prior art as known in FIG. 3.

Furthermore, a multitude of pores 2 are formed, through punching for example, on given portions of the linear portions 1b at every sides of the rotary drum 1 having the octagonal construction. This rotary drum 1 with these pores 2 is formed in such a manner that the pores 2 are formed on plate members each having given dimensions, and thereafter, every plate members with the pores 2 are connected to one another by welding and so on into an octagonal shape, or the eight plate members with the pores 2 are welded onto a frame and so on.

At every sides of the octagonal construction of the rotary drum 1 with the pores 2, a tightly-sealed jacket, i.e. an outer enclosure member 3, is provided separately for each of every sides in an individually detachable manner, so that the outer peripheral surface of the drum with the pores 2 can be easily and reliably washed.

Each of the outer enclosure members 3 has a dimension corresponding to each of every sides of the octagonal shape of the rotary drum 1. And, flanges 4, for example, fixedly welded to the outer surface of the side of the drum are coupled to flanges 5, for example, fixedly welded to the inner side of the outer enclosure member 3. Therefore, each of the outer enclosure members 3 can be mounted to and detachable from respective side of the rotary drum 1 by supporting at a handle 6 of the outer enclosure members in a tightly sealing manner. Each gas flow space 7 is formed as a space surrounded by each side of the outer peripheral surface of the rotary drum 1, the inner surface of the respective outer enclosure member 3 and the respective flanges 4, 5.

Furthermore, to feed a gas such for example as a hot air or a cooled gas into the interior of the rotary drum 1, ducts, not shown, are provided. These ducts can be used so that feed of the gas to the interior of the rotary drum 1 and discharge of the gas from the rotary drum 1 can be reversed as indicated by broken lines contrary to a case indicated by solid lines in FIG. 1.

Figure 1:
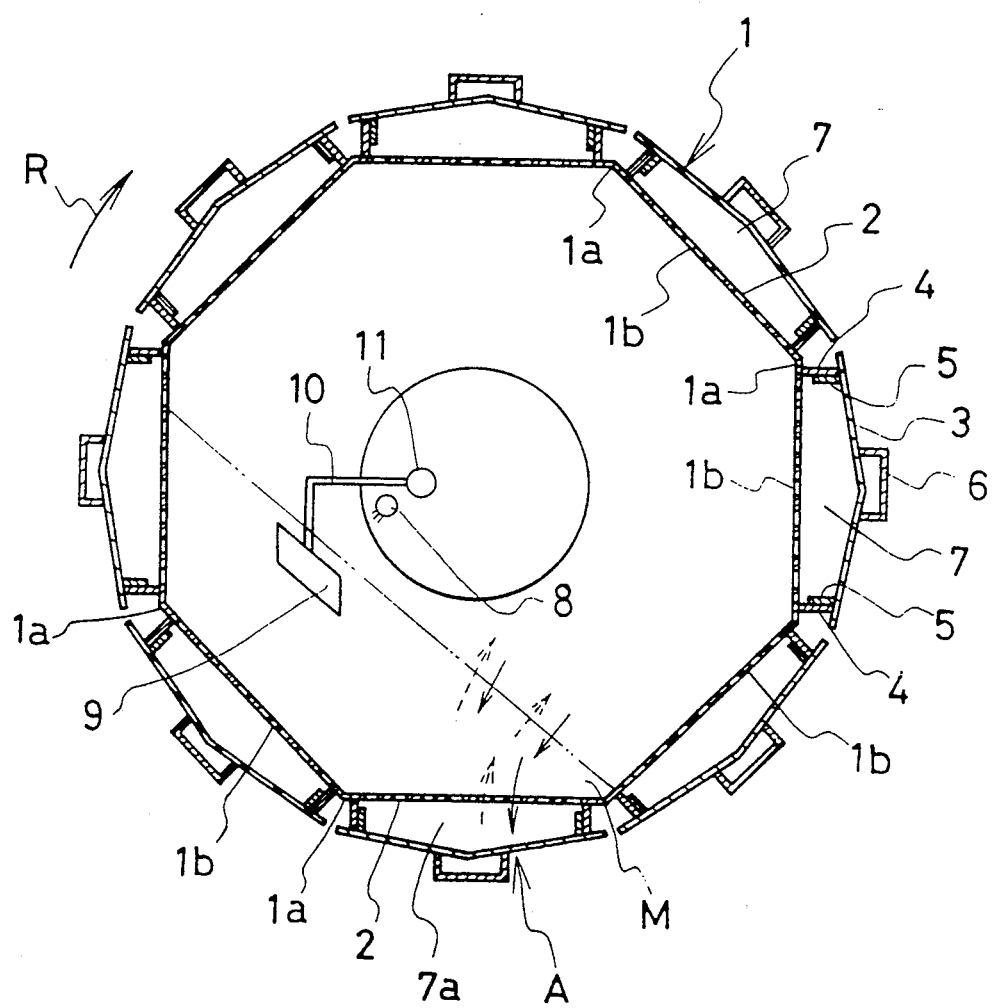
FIG. 1 is a schematic sectional view of an embodiment of the granulating and coating apparatus according to the present invention.

Namely, when the gas is fed from the inner side to the outer side of the rotary drum 1 as indicated by the solid lines in FIG. 1, the gas is fed into the interior of the rotary drum 1 through the ducts, not shown, flows through the layer of the powdery or granular material M, and through the pores 2 to the outside of the rotary drum 1, and flows in the gas flow space 7a.

On the other hand, in the case indicated by the broken lines, the gas flows inversely to the above.

Incidentally, in this embodiment, a gas flow position, through which feed or discharge of the gas as described above is performed, is a position indicated by A in FIG. 1, and, only when each side of the rotary drum 1 comes to this gas flow position A, flow of the gas is performed through the gas flow space (indicated by 7a in FIG. 1).

Furthermore, a spray nozzle unit 8 for spraying or feeding a coating liquid to the powdery or granular material M is provided in the rotary drum 1.

Further, in the interior of the rotary drum 1 of this embodiment, a baffle plate (baffle means) 9 for agitating and mixing the powdery or granular material M is provided at the advanced position in the rotating direction R of the rotary drum 1 with regard to the gas flow position.

The baffle plate 9 in this embodiment is positionally fixedly supported by a support arm 10 and a support shaft 11 and is of such an arrangement that the baffle plate 9 is not rotated together with the rotary drum 1.

Action of the granulating and coating apparatus of this embodiment will hereunder be described.

Firstly, a given quantity of the powdery or granular material M is charged into the rotary drum 1, the rotary drum 1 is rotated by the driving source, not shown, a given quantity of the coating liquid and the like are fed into the rotary drum 1 through the spray nozzle unit 8, and, as necessary, the gas such for example as the hot air or cooled gas is fed throught the ducts, not shown, to or discharged through the ducts from the rotary drum 1, the layer of the powdery or granular material M, the pores 2, and the gas flow space 7a, as indicated by the solid or broken lines in FIG. 1.

By continuing the operations the powdery or granular material is tumbled in the rotary drum 1, whereby the required granulating and/or coating operation can be performed.

In this embodiment, in addition that the rotary drum 1 has the construction of the polygonal cross-section, the baffle plate 9 is provided in the rotary drum 1. Both polygonal shape and the baffle plate are combined with each other in action, so that the powdery or granular material under the treatment can receive the optimum agitating and mixing operations, thus achieving the efficient and uniform granulating and/or coating.

In other words, in this embodiment, the rotary drum 1 has the construction of the octagonal cross-section, whereby, as the rotary drum 1 rotates, the powdery or granular material M does not slip on the inner wall surface of the rotary drum 1 owing to the slip preventing actions by the corner portions 1a and the linear portions 1b. Thus, the material M is raised to the satisfactorily high position in the advanced position in the rotating direction R. With this arrangement, the powdery or granular material M is raised to the position of the baffle plate 9 and agitated and mixed by the baffle plate 9, so that the efficient and unifrom granulating and/or coating can be achieved.

Furthermore, in this embodiment, the outer periphery of the rotary drum 1 is formed into the polygonal shape constituted by porous members having the pores and the outer enclosure members 3 are individually and detachably provided on the outer peripheral surfaces of the respective sides of the rotary drum 1. Therefore, simply by removing the outer enclosure members 3, the outer periphery of the rotary drum 1 can be easily and reliably washed, thus advantageously improving the cleanability and maintenance properties.

The finished granulated and/or coated products are taken out and recovered from a product take-out opening, not shown, by a taking-out mechanism, not shown, for example by rotating the rotary drum 1 in reverse direction.

Figure 2:
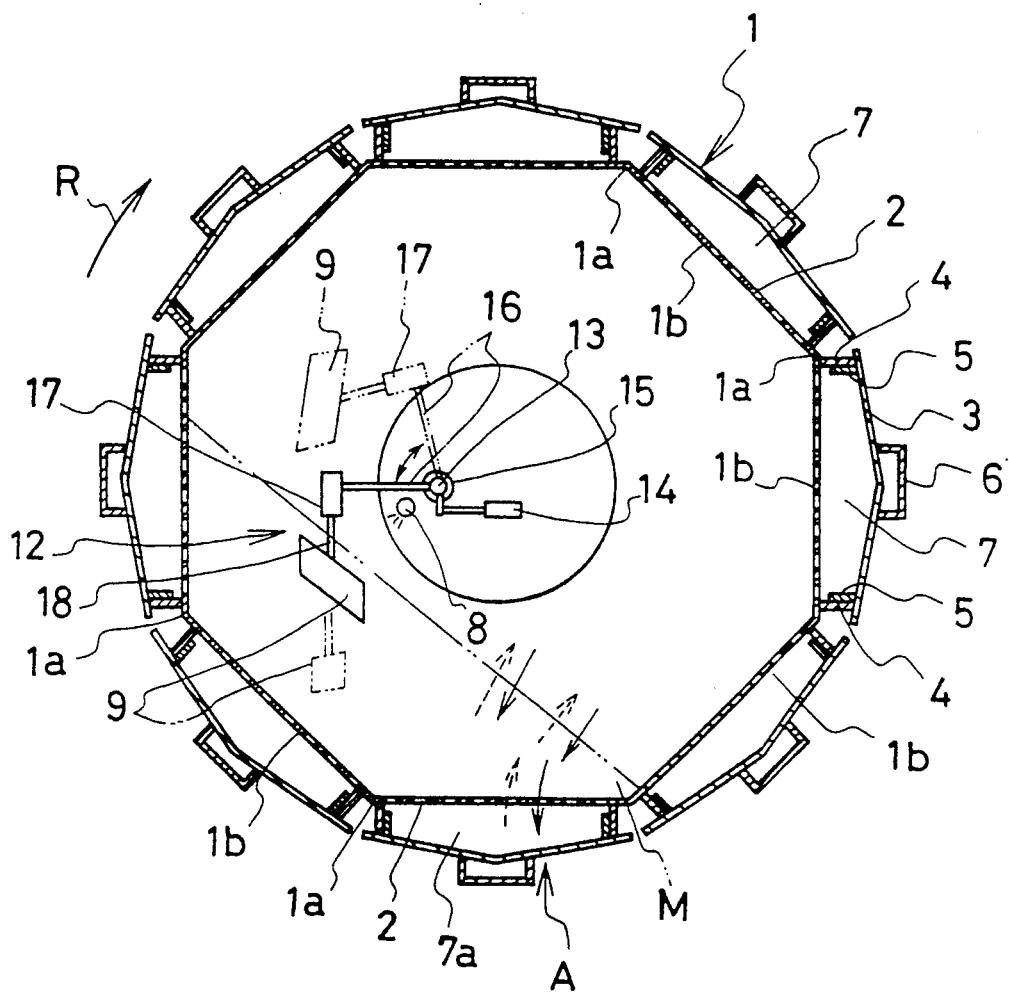
FIG. 2 is a schematic sectional view of another embodiment of the granulating and coating apparatus according to the present invention.

Second embodiment of the granulating and coating apparatus according to the invention is shown in FIG. 2 as a schematic sectional view.

This second embodiment is of such an arrangement that the position of the baffle means in the first embodiment shown in FIG. 1 is made variable.

Namely, the baffle means in this second embodiment is constituted by the baffle plate 9 similarly to the one in the first embodiment, however, this baffle plate 9 is made positionally variable by a baffle displacing means 12 within a range from the interior to the exterior of the layer of the powdery or granular material M in the rotary drum 1 as indicated by solid lines and two-dot chain lines in FIG. 2. However, the baffle plate 9 in this second embodiment does not rotate together with the rotary drum 1 as one in the first embodiment.

Description will hereunder be given of the baffle displacing means 12 for displacing this baffle plates 9. As shown in FIG. 2, the baffle displacing means 12 in this embodiment includes: a rotary shaft 13; an actuator 14 such as an air cylinder for turning or rocking this rotary shaft 13 within an angular range of about 120 degrees for example; an actuator 15 such as an air cylinder for moving the rotary shaft 13 in the axial direction thereof; an L-shaped support arm 16 integrally mounted to an end portion of the rotary shaft 13 at a given angle; an actuator 17, such for example as a rectilinearly moving and rocking type air cylinder, mounted to a forward end of this support arm 16; and a mounting bar 18 for being rectilinearly moved or rocked by this actuator 17.

The baffle plate 9 is mounted to a forward end of this mounting bar 18 at a given angle.

Accordingly, if a piston rod of the actuator 14 is moved rectilinearly in the forward or rearward direction to rock the rotary shaft 13 through a given angle, then the baffle plate 9 together with the support arm 16, mounting bar 18 are displaced by a desired value between a position of the solid lines and a position of the two-dot chain lines in FIG. 2.

In this embodiment, because of the baffle means variable in position, a further reliable agitating and mixing can be performed by locating the baffle means at an optimum position.

Namely, the baffle plate 9 as being the baffle means in this embodiment is supported by the baffle displacing means 12, whereby the rotary shaft 13 of the baffle displacing means 12 is rocked by the actuator 14 through a desired angle, so that the baffle plate 9 can be variably adjusted to a required position in the layer of the powdery or granular material M through the support arm 16 and the mounting bar 18, and moreover, can be displaced to the outside of the layer of the powdery or granular material M when unnecessary (refer to two-dot chain lines in FIG. 2), thus enabling to perform satisfactory and reliable agitating and mixing at an optimum position.

Furthermore, the rotary shaft 13 is moved by the actuator 15 in an axial direction thereof, whereby the baffle plate 9 is moved to a position of a different axial direction of the rotary drum 1, so that the powdery or granular material M can be agitated and mixed at the position in the different axial direction.

Further, the baffle plate 9 is rectilinearly moved and/or rocked by the actuator 17, whereby an insertion depth and insertion angle of the baffle plate 9 in the layer of the powdery or granular material M are changed, so that the powdery or granular material M in a different position can be optionally agitated and mixed.

The invention achieved by the present inventor has been described in detail with reference to the embodiments hereinabove. However, the present invention should not necessarily be limited to the above embodiments, and, needless to say, the invention can be variable in many ways within a scope of the invention.

For example, the shape and size of the baffle plate 9, and further, the construction of the baffle displacing means 12 and the like should not be limited to the above embodiments.

Furthermore, the detaching construction of the outer enclosure member 3 of the rotary drum 1 and the method of detaching, and further, the assembling method of the porous member formed with the pores 2 and the like should not be limited to the above embodiments.

Further, it is optional that the actuators 14, 15 and 17 are changed into actuators of hydraulic or electronic type other than the air-operated type. And, the piping system may be changed.

Needless to say, the polygonal shape of the rotary drum 1 may be changed into pentagonal, hexagonal or decagonal shape other than the octagonal shape.

In the above description, the invention achieved by the present inventor has been mainly described on the case where the invention is applied to the field of applicability, i.e. the granulating and/or coating of the pharmaceuticals, food products and chemical products, however, the invention should not be limited to this, and is widely applied to the granulating and/or coating of other powdery or granular materials, and further, to the powdery or granular material treatments such as drying and mixing.

The following are brief descriptions of advantages obtained by the typical invention out of the inventions disclosed in the present application.

(1) In the granulating and coating apparatus comprising: the rotary drum to be charged therein the powdery or granular material; and the baffle means provided in the rotary drum and not rotatable together with the rotary drum;

the rotary drum has the polygonal shape, whereby the slips of the powdery or granular material on the inner wall surface of the rotary drum along with the rotation of the rotary drum can be suppressed by the corner portions and the linear portions of the polygonal shape and the powdery or granular material can be reliably brought and raised to the position of the installation of the baffle means, so that the required function of the baffle means can be satisfactorily attained and the efficient and uniform granulating and/or coating can be achieved.

(2) By the aforesaid (1), particularly, in the larged-sized granulating and coating apparatus having a large-diameter rotary drum, slips of the powdery or granular material are reliably suppressed and the combination of this slip suppression effects with the agitating and mixing operations performed by the baffle means leads to the satisfactory granulating and/or coating.

(3) By the aforesaid (1), in the small-sized granulating and coating apparatus having a small-diameter rotary drum, there is no slip, whereby the layer of the powdery or granular material is subjected to the operation such as tumbling, so that the agitating and mixing effects obtained by the baffle means can be further satisfactorily displayed.

(4) The gas flow construction is formed in which: each of the sides of the polygon of the rotary drum is provided with the pores and gas flow space positioned outwardly of the rotary drum for causing the gas to flow individually between the interior of the rotary drum and the gas flow space; and, only when each set of the pored side and the gas flow space reaches a given gas flow position, the gas is passed from the rotary drum through the layer of the powder or granular material in the rotary drum, and through the pores into the flow space of the rotary drum, or, on the inversely, the gas is passed from the flow space of the rotary drum through the pores and further the layer of the powdery or granular material into the interior of the rotary drum; while, the baffle means is provided at the advanced position in the rotating direction of the rotary drum, so that the slip preventive action effected by the polygonal rotary drum, the agitating and mixing operations performed by the baffle means and the efficient operation of drying the powdery or granular material performed by the gas flow are combined together in effect thereby enabling to achieve the highly efficient and uniform granulating and/or coating.

(5) The baffle means may be variable in position. Therefore, by changing the position of the baffle means during rotation of the rotary drum, the material can be efficiently treated.

In that case, the baffle means can be moved through a given angle so as to change the position in the rocking direction in the layer of the powdery or granular material. The baffle means can also be displaced to the outside of the layer of the powdery or granular material when unnecessary.

Moreover, the baffle means can be moved to a position in a different axial direction by use of another actuator.

The baffle means also can be rectilinearly moved and/or rocked by use of a further actuator.

By all of these operation, the depth of insertion and insertion angle of the baffle means in the layer of the powdery or granular material can be changed, so that the powdery or granular material in different positions from one another can be agitated and mixed optionally at the optimum mode.

(6) The baffle means does not rotate together with the rotary drum, so that, to learn the coating state, sampling of the powdery or granular material can be performed safely even when the material is within the rotary drum.

What is claimed is:

1. A granulating and coating apparatus comprising a rotary drum to be charged therein a powdry or granular material and a baffle means provided in said rotary drum and not rotatable together with said rotary drum, wherein said rotary drum is polygonal.

2. The granulating and coating apparatus as set forth in claim 1, wherein:
    a gas flow construction is formed in such a manner that each of sides of a polygon of said rotary drum is respectively and independently provided with pores and with a gas flow space positioned outwardly of said rotary drum, enabling a gas to flow between each of the gas flow spaces and the interior of said rotary drum; and, only when each set of the pores and the gas flow space reaches a given gas flow position, the gas is passed from inside of the rotary drum through a layer of the powdery or granular material within the rotary drum, and through the pores into the flow space of said rotary drum, or inversely, the gas is passed from the flow space of the rotary drum through the pores and further through the layer of the powdery or granular material into the inside of the rotary drum.

3. The granulating and coating apparatus as set forth in claim 1, wherein:
    said baffle means is provided at the advanced position in the rotating direction of said rotary drum with regard to said gas flow position.

4. The granulating and coating apparatus as set forth in claim 1, wherein:
    at each of the sides of said rotary drum, a respective outer enclosure member is provided separately for each of the sides and in detachable manner.

5. The granulating and coating apparatus as set forth in claim 4, wherein:
    first flanges fixed to an outer surface of each of the sides of said rotary drum and second flanges fixed to an inner side of said outer enclosure member are coupled to each other in such a manner that said outer enclosure member can be tightly and sealingly mountable onto and detachable from the respective sides of said rotary drum.

6. The granulating and coating apparatus as set forth in claim 4, wherein:
    a handle for holding is provided at the outer surface of each of said outer enclosure members.

7. The granulating and coating apparatus as set forth in claim 1, wherein:
    said baffle means is supported to be positioned fixedly by a support arm for mounting said baffle means and a support shaft for mounting said support arm.

8. The granulating and coating apparatus as set forth in claim 1, wherein:
    said baffle means is supported by a baffle displacing means in such a manner that the baffle means is variably positioned.

9. The granulating and coating apparatus as set forth in claim 8, wherein:
    said baffle displacing means includes: a rotary shaft; a first actuator for rocking said rotary shaft within a given angular range; and support arm for securing said baffle means to said rotary shaft.

10. The granulating and coating apparatus as set forth in claim 9, wherein:
    said apparatus has a second actuator for moving said rotary shaft in an axial direction.

11. The granulating and coating apparatus as set forth in claim 9, wherein:
    a rectilinearly and rockingly moving type third air actuator and a mounting bar which is rectilinearly moved and rocked by the third actuator are interposed between said baffle means and support arm, the baffle means being mounted to the forward end of the mounting bar.

* * * * *